(12) United States Patent
Ceres et al.

(10) Patent No.: US 10,239,772 B2
(45) Date of Patent: Mar. 26, 2019

(54) RECYCLING LOOP METHOD FOR PREPARATION OF HIGH CONCENTRATION OZONE

(71) Applicant: Advanced Diamond Technologies, Inc., Romeoville, IL (US)

(72) Inventors: Donato M. Ceres, Chicago, IL (US); John Arthur Carlisle, Plainfield, IL (US); Prabhu Arumugam, Ruston, LA (US); Matthew Hart, Wood Dale, IL (US)

(73) Assignee: Advanced Diamond Technologies, Inc., Romeoville, IL (US)

( * ) Notice: Subject to any disclaimer, the term of this patent is extended or adjusted under 35 U.S.C. 154(b) by 365 days.

(21) Appl. No.: 15/167,389

(22) Filed: May 27, 2016

(65) Prior Publication Data

US 2016/0347629 A1 Dec. 1, 2016

Related U.S. Application Data

(60) Provisional application No. 62/167,570, filed on May 28, 2015.

(51) Int. Cl.
*C25B 1/13* (2006.01)
*C02F 1/461* (2006.01)
(Continued)

(52) U.S. Cl.
CPC ........ *C02F 1/4672* (2013.01); *C02F 1/46104* (2013.01); *C02F 1/46109* (2013.01);
(Continued)

(58) Field of Classification Search
CPC ..................................................... C25B 1/13
See application file for complete search history.

(56) References Cited

U.S. PATENT DOCUMENTS

| | | | |
|---|---|---|---|
| 3,616,355 A | 10/1971 | Themy et al. | |
| 4,255,246 A | 3/1981 | Davis et al. | |

(Continued)

FOREIGN PATENT DOCUMENTS

| | | | | |
|---|---|---|---|---|
| EP | 0368812 A1 | * | 5/1990 | ............... C25B 1/10 |
| WO | WO 02/17975 A1 | | 3/2002 | |

OTHER PUBLICATIONS

PCT Notification of Transmittal of the Internationai Search Report and the Written Opinion of the Internationai Searching Authority, or the Declaration with accompanying PCT Internationai Search Report and PCT Written Opinion of the International Searching Authority dated Jan. 8, 2018.

(Continued)

*Primary Examiner* — Nicholas A Smith
(74) *Attorney, Agent, or Firm* — Locke Lord LLP; Peter J. Fallon

(57) ABSTRACT

The present invention relates to an apparatus for the production of ozone from water comprising at least one cell, consisting of an anode, a cathode and an interposed cation-conducting membrane, wherein the membrane conductively connects the anode and the cathode while forming flow channels for water that are separated from one another as anode and cathode chambers and wherein the flow channels are configured to allow for the recirculation of the water flow within the chambers. The present invention further relates to an electrochemical method and apparatus for producing ozone or dissolved ozone in water in high concentrations by mean of recirculation of water between at least one chamber and at least one water tank.

20 Claims, 8 Drawing Sheets

(51) Int. Cl.
*C02F 1/467* (2006.01)
*C25B 15/08* (2006.01)

(52) U.S. Cl.
CPC .............. *C25B 1/13* (2013.01); *C25B 15/08* (2013.01); *C02F 2001/46133* (2013.01); *C02F 2001/46147* (2013.01); *C02F 2001/46185* (2013.01); *C02F 2201/46115* (2013.01); *C02F 2305/023* (2013.01)

(56) References Cited

U.S. PATENT DOCUMENTS

| | | | |
|---|---|---|---|
| 4,767,511 A | | 8/1988 | Aragon |
| 4,978,438 A | | 12/1990 | Shimamune et al. |
| 5,529,683 A | * | 6/1996 | Critz .................... C25B 1/13 205/342 |
| 5,900,127 A | | 5/1999 | Iida et al. |
| 5,972,196 A | * | 10/1999 | Murphy ................. B01D 53/22 204/157.15 |
| 5,997,702 A | * | 12/1999 | Koganezawa ............ C25B 1/13 204/262 |
| 6,319,390 B1 | | 11/2001 | Kono et al. |
| 6,855,242 B1 | | 2/2005 | Comninellis et al. |
| 7,704,353 B2 | | 4/2010 | Stadelmann et al. |
| 7,887,679 B2 | | 2/2011 | Kitaori et al. |
| 7,951,274 B2 | | 5/2011 | Yoshida et al. |
| 8,277,623 B2 | | 10/2012 | Kato et al. |
| 8,323,461 B2 | | 12/2012 | Scarsbrook |
| 8,361,289 B2 | | 1/2013 | Whitehead et al. |
| 8,431,006 B2 | | 4/2013 | Arihara et al. |
| 8,591,856 B2 | | 11/2013 | Doering et al. |
| 8,734,626 B2 | | 5/2014 | Arihara et al. |
| 8,815,064 B2 | | 8/2014 | Kato et al. |
| 8,980,079 B2 | | 3/2015 | Yost, III et al. |
| 9,380,920 B2 | | 7/2016 | Pollack |
| 2002/0130091 A1 | | 9/2002 | Ekberg et al. |
| 2005/0139487 A1 | | 6/2005 | Zwicker et al. |
| 2008/0179185 A1 | * | 7/2008 | Hashimoto ............... C25B 1/13 204/262 |
| 2008/0251108 A1 | | 10/2008 | Nagai et al. |
| 2009/0211918 A1 | | 8/2009 | Hardee |
| 2010/0006450 A1 | | 1/2010 | Whitehead et al. |
| 2010/0084634 A1 | * | 4/2010 | Gamo .................... C23C 16/27 257/40 |
| 2010/0135869 A1 | | 6/2010 | Shiue et al. |
| 2010/0170783 A1 | | 7/2010 | Wesner et al. |
| 2011/0011736 A1 | * | 1/2011 | Yost, III ................ C02F 1/4672 204/263 |
| 2012/0205255 A1 | | 8/2012 | Roster et al. |
| 2013/0032491 A1 | | 2/2013 | Nitta et al. |
| 2013/0206604 A1 | | 8/2013 | Lutz et al. |
| 2013/0206654 A1 | | 8/2013 | Lutz et al. |
| 2013/0240458 A1 | | 9/2013 | Conradt et al. |
| 2013/0341204 A1 | | 12/2013 | Sung |
| 2014/0174942 A1 | | 1/2014 | Wylie et al. |
| 2014/0054166 A1 | | 2/2014 | Brandon et al. |
| 2014/0076724 A1 | | 3/2014 | Cheng et al. |
| 2015/0129419 A1 | | 5/2015 | Sekiguchi et al. |
| 2015/0167183 A1 | | 6/2015 | Müller et al. |
| 2015/0376804 A1 | | 12/2015 | Gorokhovsky et al. |
| 2016/0101997 A1 | | 4/2016 | Hamaguchi et al. |

OTHER PUBLICATIONS

Marshall Stoneham, "Forward," pp. ix-x (Jun. 2000).
D.M. Gruen, "Applications of ultrananocrystalline diamond films," pp. 313-317 (Jan. 2000).
M.H. Nazaré et al., Properties, Growth and Applications of Diamond, pp. xi-xx (Dec. 8, 2000).
S. Ferro et al., "Chlorine Evolution at Highly Boron-Doped Diamond Electrodes," Journal of The Electrochemical Society, 147:7, pp. 2614-2619 (2000).

\* cited by examiner

RECYCLING LOOP METHOD FOR PREPARATION OF HIGH CONCENTRATION OZONE

This application is a Non-Provisional Application, which claims priority of Provisional Application No. 62/167,570, filed on May 28, 2015, which is hereby incorporated by reference in its entirety.

FIELD OF THE INVENTION

The present invention relates to an apparatus for the production of ozone from water comprising at least one cell, consisting of an anode, a cathode and an interposed cation-conducting membrane, wherein the membrane conductively connects the anode and the cathode while forming flow channels for water that are separated from one another as anode and cathode chambers and wherein the flow channels are configured to allow for the recirculation of the water flow within the chambers. The present invention further relates to an electrochemical method and apparatus fir producing ozone or dissolved ozone in water in high concentrations by mean of recirculation of water between at least one chamber and at least one water tank.

BACKGROUND

Ozone is known as a substance, in the nature, having an extremely strong oxidizing power and has been widening its applications over various industries. For instance, ozone is utilized in waterworks and sewage plants for the sterilizing and decolorizing treatments. Another advantage of ozone is the nature that it turns to harmless oxygen through autolysis with time lapse. Ozone, therefore, is appreciated as a chemical used for sterilizing and decolorizing processes which are easier and safer in handling than the former processes by chemicals, without secondary contamination by chemical residues or reaction by-products, offering an easy post-treatment.

Well known methods of ozone production include the UV lamp process, the silent discharge process, and the electrolysis process. The UV lamp process produces ozone through exciting oxygen by UV rays, available from a relatively simple unit, but the production volume is limited and therefore, popularly used for deodorizing rooms and cars. The silent discharge process is one of the most prevalent and commonly used ozone generation methods. It is widely applied for various purposes ranging from simple room deodorizing by a small-scale ozonizer to industrial water treatment by a large-scale ozonizer with an output capacity of several tens kilograms per hour. The silent discharge process uses oxygen gas or oxygen in air as feed material, and generates ozone through excitation by electric discharge.

Ozone generation processes that utilize water as feedstock are usually electrochemical processes that electrolyze water to produce oxidized end products, such as oxygen, ozone, and hydrogen. Water electrolysis occurs as described by the following equations:

$$2H_2O \rightarrow O_2 + 4H^+ + 4e^- \quad E_0 = 1.229V \quad (1)$$

$$3H_2O \rightarrow O_3 + 6H^+ + 6e^- \quad E_0 = 1.511V \quad (2)$$

$$O^2 + H_2O \rightarrow O_3 + 2H^+ + 2e^- \quad E_0 = 2.075V \quad (3)$$

There are a variety of electrochemical processes that can accomplish these reactions and all have different production efficiencies.

In general, there are three basic cell designs: 1) flow cell composed of an anode and a cathode separated by a gap; 2) a cell composed of an anode and a cathode separated by a polymeric electrolyte, often a fluoropolymer-copolymer membrane that acts as a selective proton exchange membrane (PEM, proton exchange membrane); and 3) a cell that is composed of an anode and cathode separated and in direct contact with the polymeric membrane. By using a suitable anode material (usually Pt, $PbO_2$, DSA, DLC, BDD), all cell designs can generate ozone to different extents. However, due to the extremely high oxidation potential of the reactions involved, the type of the anode dictates significantly the overall efficiency of production.

There are some anodes material, like Pt, on which reaction (1) is particularly thermodynamically and kinetically more favorable than reaction (2). This results in a, so-called, "solvent limit" that limits significantly the relative proportions of oxygen and ozone. In order to compensate for the lower ozone production, the voltage at the Pt electrode needs to be pushed higher, generating a significantly higher current due to a significant oxygen evolution. Furthermore, during the reaction Pt electrodes are susceptible to a severe transformation in which Pt oxide particles are formed and detached from the surface. In a cell configuration where the electrode is in direct contact with the polymeric membrane, these particles can irreversibly damage the membrane, affecting significantly production efficiency and severely limits the lifetime of the membrane. Boron-doped diamond (BDD) anodes have intrinsically a much higher solvent limit (oxygen evolution) so that the great majority of the current is actually used for the generation of ozone. Moreover, compared to other coated electrodes, UNCD®-coated Nb electrodes (Advanced Diamond Technologies Co., Romeoville, Ill.) are particularly stable and allow for a much higher current density without the physical damage observed on Pt electrodes. Ozone generation apparatus employing UNCD® electrodes (Advanced Diamond Technologies Co., Romeoville, Ill.) that are in contact with a polymeric membrane last much longer and maintain a higher current efficiency.

Nevertheless, conventional methods utilize a single pass mechanism/configuration in which water is flowed through the cell, reacted, and ejected. Through this process, ozone gas is produced and the water is ejected from the system. This results in a constant ozone output while water is flowed through the system, but results in low concentrations, which cannot be efficiently utilized and requires significantly large ozone generators in order to compensate for the lower efficiency. As such, the large size of the ozone generators and the inability of the conventional methods to provide a high concentration of readily available dissolved ozone have been limitations to widespread adoption of such technology.

Thus, there remains a need for a method of production of ozone from which results in smaller size ozone generators that can produce higher concentrations of readily available dissolved ozone.

BRIEF SUMMARY OF THE INVENTION

The present relates to an apparatus and method for the production of ozone from water.

In one aspect, the invention provides an apparatus for the production of ozone from water comprising an electrolytic cell including at least one reaction chamber, an anode and a cathode spaced apart from said anode, and one or more water storage tanks configured for the recirculation of water through one or more reaction chambers.

In certain embodiments of the apparatus for the production of ozone from water of the invention, the anode and cathode are housed in separate chambers, wherein said chambers are in communication through a polymer electrolyte membrane.

In other embodiments of the apparatus for the production of ozone from water of the invention, the anode and cathode are housed in the same chamber and are in communication through a polymer electrolyte membrane.

In still other embodiments of the apparatus for the production of ozone from water of the invention, the anode and cathode are housed in separate chambers and are supplied water from separate water storage tanks such that the water from each tank is recirculated separately.

In yet other embodiments of the apparatus for the production of ozone from water of the invention, the anode and cathode are housed in separate chambers and are supplied water from the same water storage tank such that the water from the tank is recirculated across both the anode and cathode.

In other embodiments of the apparatus for the production of ozone from water of the invention, the anode is supplied water from a water storage tank such that the water from the tank is recirculated and the cathode is supplied water from a separate flow through source.

In other embodiments of the apparatus for the production of ozone from water of the invention, the anode and cathode are housed in the same chamber and are supplied water from one storage tank such that the water from the tank is recirculated across both the anode and cathode.

In certain embodiments of the apparatus for the production of ozone from water of the invention, the polymer electrolyte membranes is a poly(perfluorosulfonic acid) membrane, a styrene based membrane, or a poly(arylene ether) membrane. In particular embodiments, the polymer electrolyte membranes is a poly(perfluorosulfonic acid) membrane.

In another aspect, the invention provides a method for producing ozone from water comprising steps of:
providing an apparatus for the production of ozone from water of the invention, and
electrolyzing water to produce ozone.

In another aspect, the invention provides a method for producing dissolved ozone in water comprising steps of:
providing an apparatus for the production of ozone from water of the invention,
electrolyzing water produce electrolyzed water containing dissolved ozone, and
recirculating the electrolyzed water containing dissolved ozone through the apparatus one or more times until a desired concentration of ozone is obtained.

In certain embodiments, of the method for producing concentrated ozone-water of the invention, the electrolyzed water containing dissolved ozone is recirculated continuously.

In other embodiments of the method for producing concentrated ozone-water of the invention, wherein the electrolyzed water containing ozone is only recirculated through the anodic chamber or the both the anodic and cathodic chambers of the apparatus.

DETAILED DESCRIPTION

Figure 1:
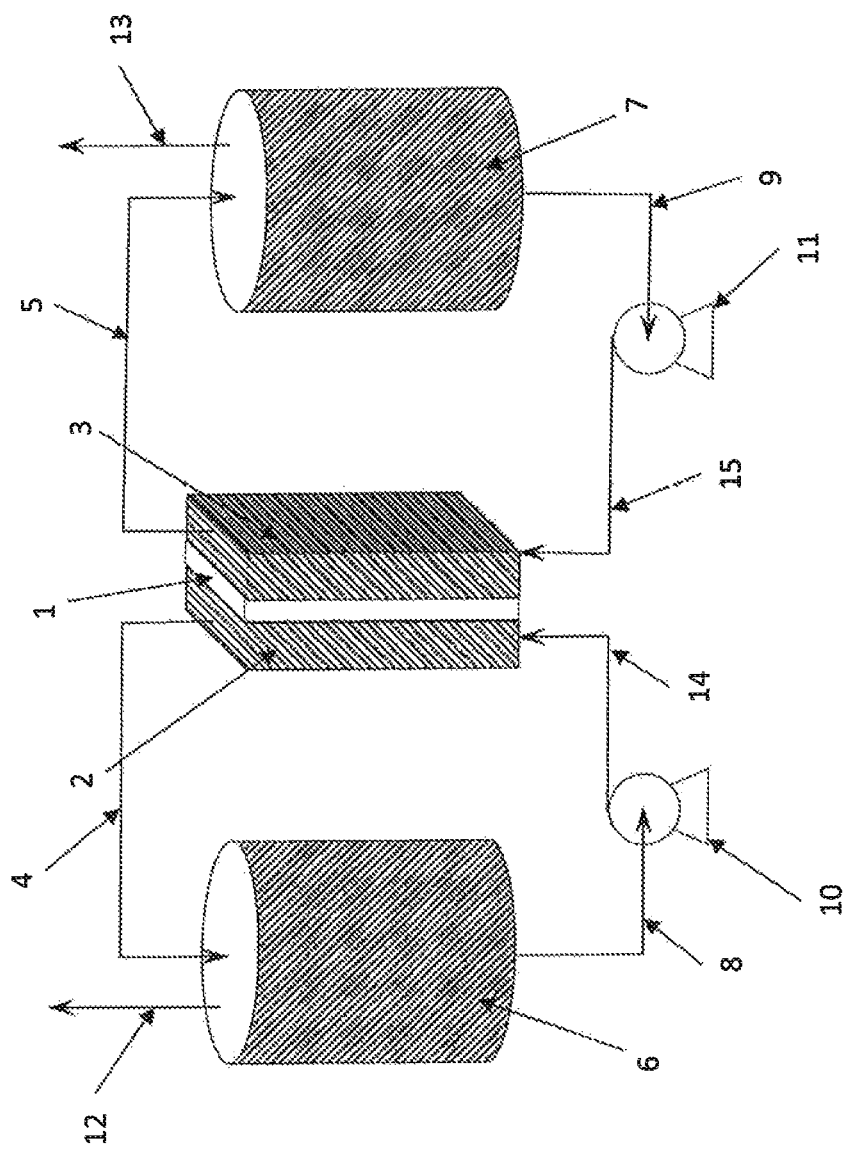
FIG. 1 is a schematic representation of a polymer electrolyte electrolysis membrane unit configured to use two separate closed loops: one cathodic and the other anodic.

The present invention applies to all types of cell designs. In particular embodiments, the invention is utilized in cells that have the cathode and anode chambers divided by a PEM membrane (including the zero-gap), hence allowing the separation of the catholyte and anolyte. The need for a membrane is twofold: first, the membrane is highly permeable to protons that are generated at the anode following reactions (1)-(3). The proton is transferred to the cathode surface where it is reduced to hydrogen gas as per the following equation:

$$2H^+ + 2e^- \rightarrow H_2 \quad E_0 = 0V \qquad (4)$$

The recombination of the hydrogen cations at the cathode surface, releases hydrogen gas in the catholyte.

Ozone generation can be accomplished with a variety of processes. In general, however, methods that employ air or oxygen produce ozone in the gas form, which is difficult to dissolve in the water at high concentrations. Water electrolysis, at the contrary, produces ozone directly from the water itself and therefore does not require additional apparatus for the incorporation of the ozone in the water. It is well established in the literature that water electrolysis allows for a more efficient production of dissolved ozone. Nonetheless, even with water electrolysis, it is still difficult to achieve high ozone concentrations while maintaining a small electrochemical cell. Water electrolysis at an anode surface is in a first order proportional to the surface area of the electrode. In the absence of a secondary mechanism to concentrate the ozone, higher ozone concentrations can only be achieved with larger anodes and higher current densities.

The importance of producing high ozone concentrations is dictated by the relatively short lifetime of the ozone. While ozone is a potent oxidant and is required in small amount in order to effectively deactivate microorganisms, remove biofilms, and partly mineralize organics, its lifetime is relatively short. At room temperature, ozone's half-life is about 10-20 min. Therefore, ozone cannot be stored for further use, but has to be generated at the point of use with an apparatus. Factors that can affect the ozone concentration and half-life are: water temperature, ozone concentration, organic residuals in the water, organics present in the reservoir and tubing, salt concentration and type, presence of metals, and turbulence. All these factors can severely limit the amount of ozone generated. Because of these limitations, it is important to be able to generate very high concentrations of dissolved ozone on demand just prior of usage and right at the output of the apparatus. Technologies like corona discharge do allow for the generation of ozone at the point of use, however, corona discharge suffers of severe limitations of dissolving ozone in the water. This limitation is usually compensated with a very large apparatus.

High ozone concentration may also achieved by high current densities. The problem with the production of ozone at high current densities is twofold. The first problem is related to the anode stability. Very few types of anodes are stable enough to withstand high current densities. For instance, in a cell configuration containing an anode and a cathode separated by a fluoropolymer-copolymer membrane, Pt anodes are relatively common. However, Pt anodes, while very stable under normal conditions, at high current densities they degrade and form Pt oxide particles that detach from the electrode and damage irreversibly the membrane, hence reducing dramatically the lifetime of the apparatus and limiting considerably the efficiency of ozone production. The second problem associated with high current densities is related to the drop in ozone production with respect to oxygen production. The oxidation potential of ozone formation is actually significantly higher than that of oxygen evolution. Consequently oxygen evolution is thermodynamically more favorable than ozone formation. Anodes that exhibit low oxygen evolution potentials will not produce much ozone and most of the current will be used primarily for the formation of oxygen.

Electrolyte Membrane

The ozone production apparatus and method of the invention maybe used with any type of electrolyte membrane commonly known in the art. In certain embodiments, the ozone production apparatus and method of the invention utilize a polymer electrolyte membrane (PEM) that separates the catholyte from the anolyte.

Conventional electrolyte membranes include poly(perfluorosulfonic acid) membranes, including, but not limited to, as NAFION® (DuPont), ACIPLEX (Asahi Chemical Company), FLEMION (Asahi Glass Company); styrene based membranes, including, but not limited to, BAM (Ballard), SEBS (Dias Analytic); and poly(arylene ether) membranes, including, but not limited to, poly(arylene ether ether ketone) and poly(arylene ether sulfone).

System Configuration

In one aspect, the invention provides an apparatus for the production of ozone from comprising one or more chambers. If only one chamber is used, the cathode and anode are disposed in the chamber and separated by an electrolytic/proton transfer membrane. If two chambers are used, the cathode and anode may be disposed in separate chambers and the chambers configured to be in communication with each other through an electrolytic/proton transfer membrane.

The one or more ozone production chambers are in series with one or more water storage tanks which optionally have a water inlet, a water outlet, and/or a gas outlet valve. The storage tanks are in communication with the ozone production chambers through a pump, such that water is pumped through the ozone production chamber to react and recycled back into the storage tank where hydrogen and oxygen/ozone gases accumulate until they are vented through the respective gas outlet valve.

In certain embodiments, the cathodic ozone production chamber is not connected to a storage tank, but instead is connected to a water flow through such that the water flowed through the cathodic chamber, along with any hydrogen gas produced are immediately expelled.

In certain other embodiments, the cathodic and anodic ozone production chambers are in communication with a single water storage tank such that all gases are collected and vented through the same gas outlet valve.

The benefits of recycling loops are several.

1) Smaller and Less Costly Ozone Generating Apparatus

The ozone production apparatus and method of the invention, allows the recycling of ozonated water in a close loop system, increasing ozone concentration over time. This method allows for the electrolysis apparatus to be significantly smaller than in the absence of the loops system, enabling the entire system to be portable and cost efficient.

FIG. 1 depicts a schematic representation of a polymer electrolyte electrolysis membrane (1) unit configured to use two separate closed loops: one cathodic and the other anodic. In includes an anoid cell compartment (2), cathodic cell compartment (3), anodic cell outlet pipe (4), cathodic cell outlet pipe (5), anodic tank (6), cathodic tank (7), anodic tank outlet pipe (8), cathodic tank outlet pipe (9), anodic recirculation pump (10), cathodic recirculation pump (11), anodic gas exhaust (12), cathodic gas exhaust (13), anodic cell inlet pipe (14), and a cathodic cell inlet pipe (15).

2) Significantly Higher Ozone Concentration

The ozone production method of the invention utilizes closed loops that can be filled with ultrapure water, hence reducing the amount of the agents that can limit the production of ozone. As soon as the ozone concentration has reached a desired level, it can be dosed or vented accordingly. A high concentration of ozone allows the operator to guarantee performance of disinfection, or sterilization, or bacterial deactivation, knowing that the starting concentration of ozone is reliably high. In this way losses from the output of the device to the point of usage may be compensated accordingly with a higher output ozone concentration.

3) More Reliable Ozone Production

Because, in certain embodiments, both loops are closed and isolated, the operator can control the water composition and ensure the absence of contaminants that can scavenge and destroy the ozone and limit its lifetime. Moreover, water can be chosen to be absent of scale-producing agents like $Ca^{2+}$ and $Mg^{2+}$. This is a great advantage compared to open configurations that have access to a source of clean water or use tap water.

Figure 2:
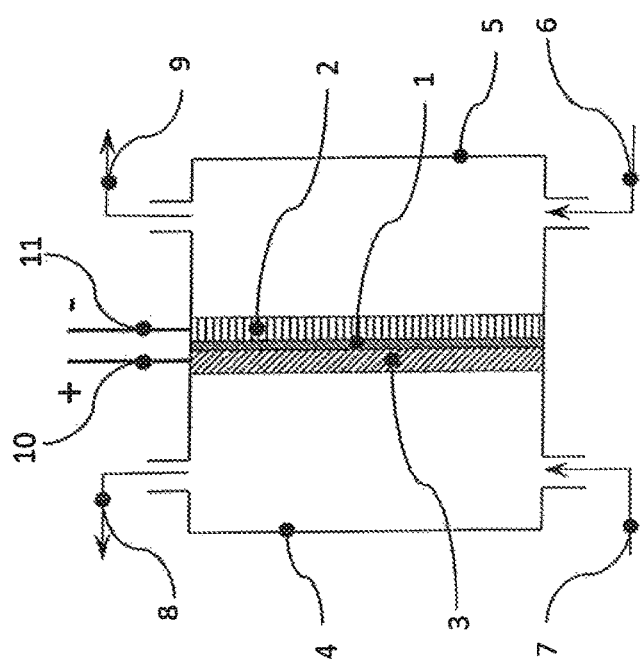
FIG. 2 is a schematic representation of a polymer electrolyte electrolysis unit configured to use two separate closed loops wherein the cathode and anode are configured to be in contact with the polymer electrolyte membrane.

FIG. 2 depicts a polymer electrolyte electrolysis unit (1) configured to use two separate closed loops wherein the cathode and anode are configured to be in contact with the polymer electrolyte membrane. In includes a cathode (2), an anode (3), anodic cell compartment (4), cathodic cell compartment (5), catholyte inlet (6), analyte inlet (7), anolyte outlet (8), catholyte outlet (9), positive pole power supply (10) and (11) negative pole power supply.

Figure 3:
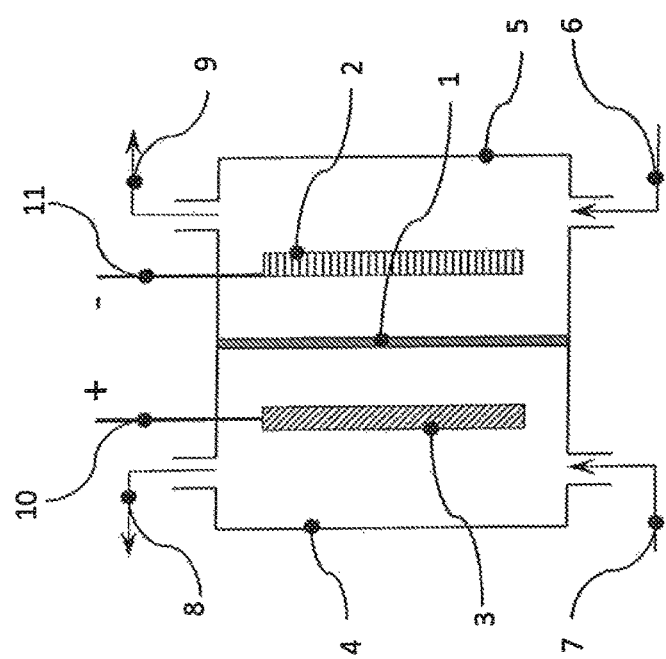
FIG. 3 is a schematic representation of a polymer electrolyte electrolysis unit configured to use two separate closed loops wherein the cathode and anode are configured to be separated from the polymer electrolyte membrane.

FIG. 3 depicts a polymer electrolyte electrolysis unit (1) configured to use two separate closed loops wherein the cathode and anode are configured to be separated from the polymer electrolyte membrane. In includes a cathode (2), an anode (3), anodic cell compartment (4), cathodic cell compartment (5), catholyte inlet (6), anolyte inlet (7), anolyte outlet (8), catholyte outlet (9), positive pole power supply (10) and negative pole power supply (11).

Figure 4:
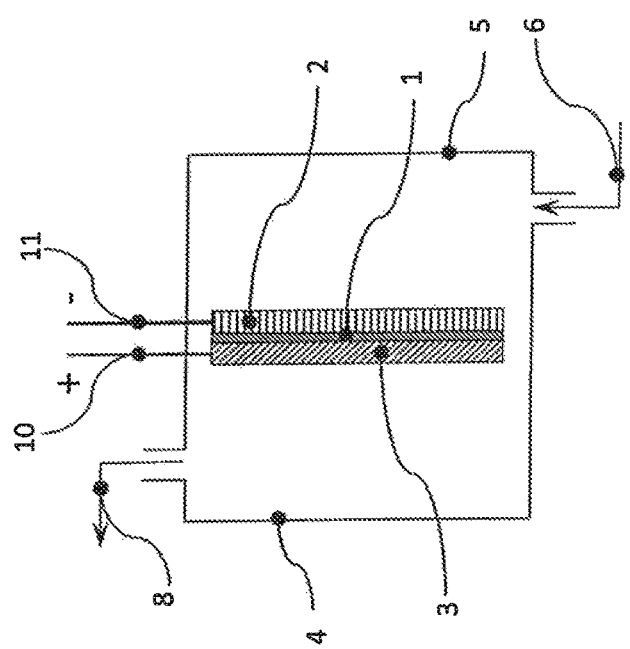
FIG. 4 is a schematic representation of a polymer electrolyte electrolysis unit configured to use one closed loop wherein the cathode and anode are housed in the same chamber and configured to be separated from the polymer electrolyte membrane.

FIG. 4 depicts a polymer electrolyte electrolysis unit (1) configured to use one closed loop wherein the cathode and anode are housed in the same chamber and configured to be separated form the polymer electrolyte membrane. It includes a cathode (2), an anode (3), anodic cell compartment (4), cathodic cell compartment (5), catholyte inlet (6), anolyte inlet (7), anolyte outlet (8), catholyte outlet (9), positive pole power supply (10) and negative pole power supply (11).

Figure 5:
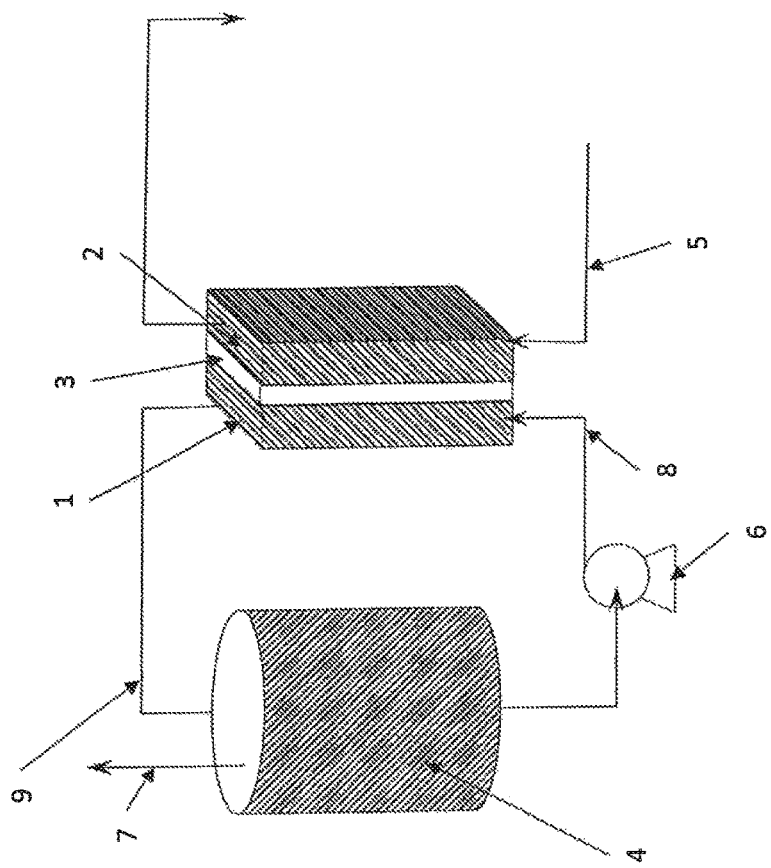
FIG. 5 is a schematic representation of a polymer electrolyte electrolysis membrane unit configured to use a single anodic closed loop and a cathodic flowthrough port.

FIG. 5 depicts a polymer electrolyte electrolysis membrane unit configured to use a single anodic closed loop and a cathodic flowthrough port. It includes an anode compartment (1), a cathode compartment (2), PEM (3), anodic tank (with ozone) (4), cathodic flow through (5), anodic recirculation pump (6), gas exhaust (7), water inlet (8), water outlet plus O3 (9).

Figure 6:
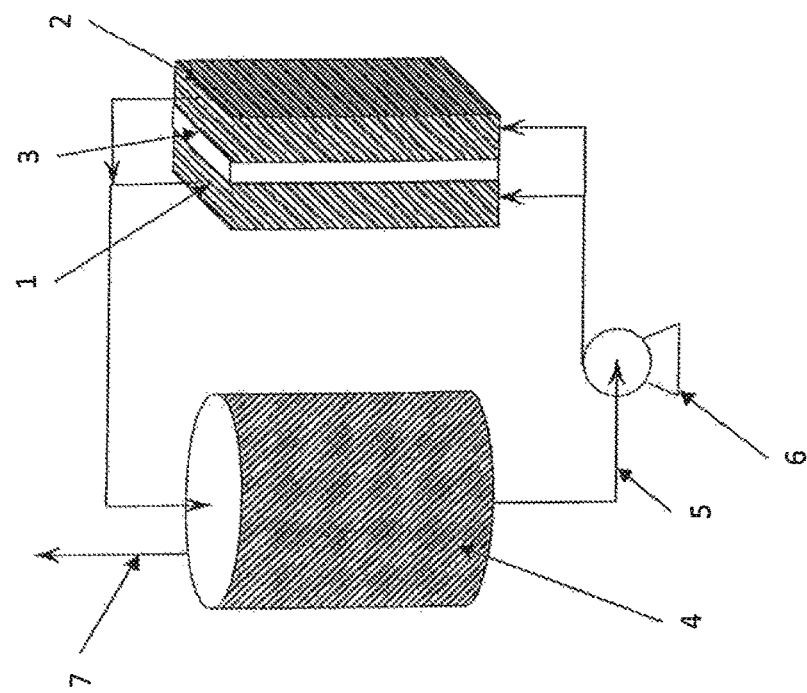
FIG. 6 is a schematic representation of a polymer electrolyte electrolysis membrane unit configured to use one recirculation closed loop where the anodic and cathodic chambers are separated from the polymer electrolyte membrane.

FIG. 6 depicts a polymer electrolyte electrolysis membrane unit configured to use one recirculation closed loop where the anodic and cathodic chambers are separated from the polymer electrolyte membrane. It includes an anodic compartment (1), a cathodic compartment PEM (3), batch tank (4), recirculation loop (5), recirculation pump (6), and a gas exhaust (7).

Figure 7:
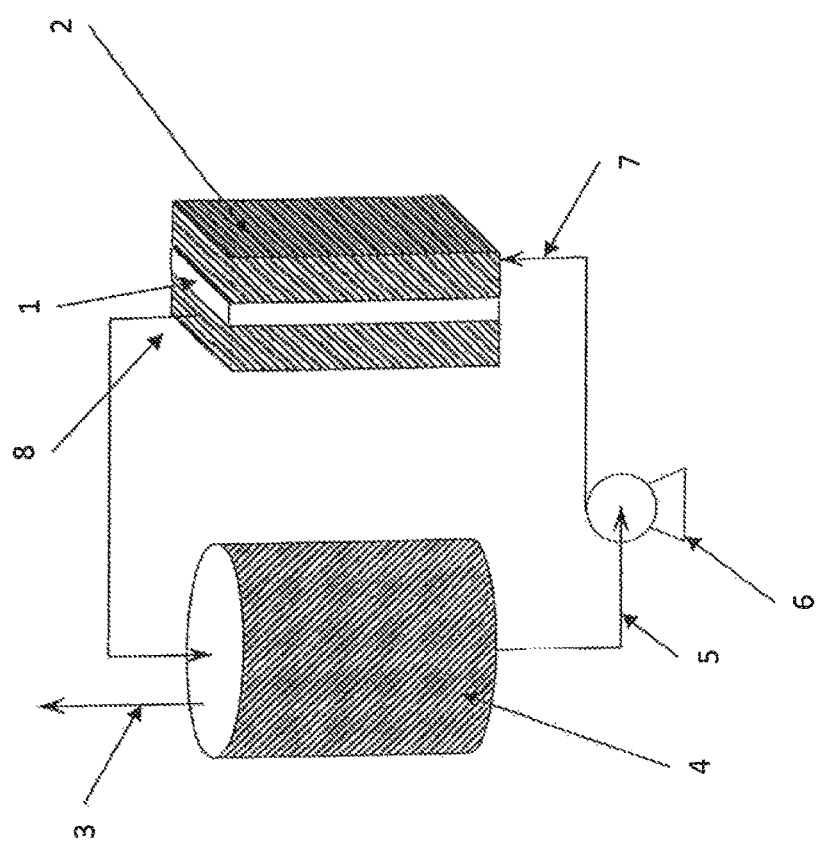
FIG. 7 is a schematic representation of a polymer electrolyte electrolysis membrane unit configured to use one recirculation closed loop where the anode and cathode are housed in the same chamber and separated by a polymer electrolyte membrane.

FIG. 7 depicts a polymer electrolyte electrolysis membrane unit configured to use one recirculation closed loop where the anode and cathode are housed in the same chamber and separated by a polymer electrolyte membrane. It includes an anode/cathode compartment (1), cell body (2), gas exhaust (3), water tank (4), recirculation loop (5), recirculation pump (6), cell inlet (7), cell outlet (8).

Figure 8:
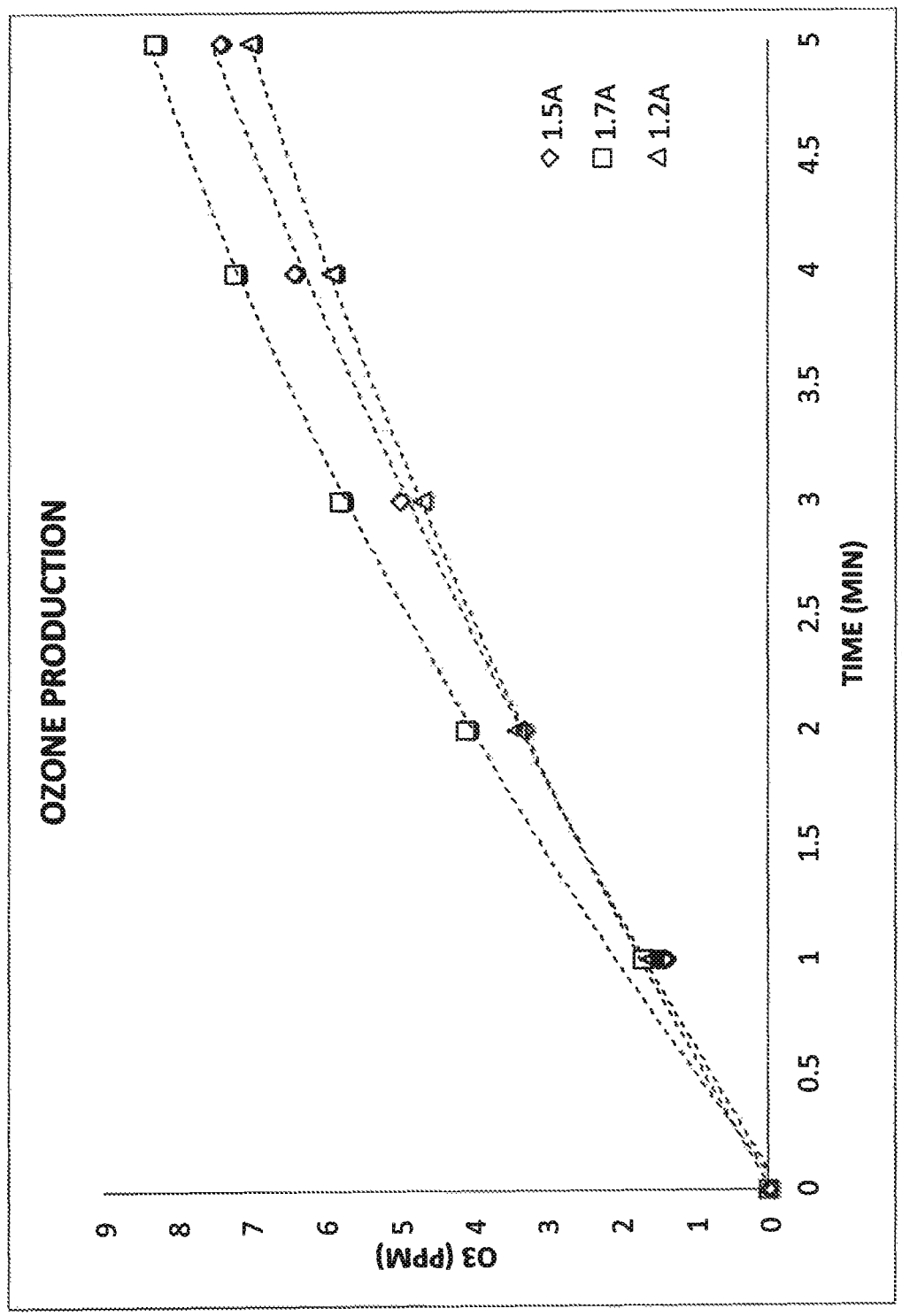
FIG. 8 is a graph of an increase of the ozone in the anoic loop over 5 minutes of closed loop recirculation.

FIG. 8 depicts a graph of an increase of the ozone in the anoic loop over 5 minutes of closed loop recirculation. For example, high ozone concentration was reached using an apparatus configuration depicted in FIG. 1, where a cell comprising of an UNCD anode and cathode are spaced by a Nation membrane and the anode and cathode chamber are separated. Deionized water was flowing in both sides of the cell, independently. When a constant current was applied to the cell, the level of ozone increased steadily for as long as the current was applied.

4) Enables Low Current Densities Cell Configurations

In embodiments using a close loop configuration, the oxidation potential of the system can be kept relatively low, allowing the ozone concentration to build up over time. Hence, the close loops method of the invention can be actually used with electrolytic system that has anodes with low ozone production efficiency. Using more stable anodes, such as UNCD® (Advanced Diamond Technologies Co., Romeoville, Ill.) anodes, the ozone-producing apparatus can operate at lower current densities, generate ozone faster, and have a significantly longer lifetime.

System Components

The storage tanks, ozone production chambers, inlet and outlet valves, circulation and recirculation pumps, as well as any power supplies, hoses or pipes required to connect them are not particularly limited. Conventional materials as would be known to those of skill in the art may be used for the preparation of the apparatus.

The cathode is not particularly limited. Conventional cathode materials as would be known to those of skill in the art may be used for the preparation of the apparatus.

The anode is not particularly limited. Conventional anode materials as would be known to those of skill in the art may be used for the preparation of the apparatus.

In certain embodiments, the cathode and anode are the same material.

In particular embodiments, the anode is a conductive diamond anode. In particular embodiments, the conductive diamond anode is doped with boron. In still other particular embodiments, the conductive diamond membrane is a nanocrystaline diamond anode is coated onto a substrate such as silica. Such nanocrystaline diamond anodes include, but are not limited to, UNCD® (Advanced Diamond Technologies Co., Romeoville, Ill.).

In order to minimize ozone decay in the loops, recirculation and temperature should be controlled. Although these two parameters are adjusted empirically and are dependent on the actual system configuration, cell design, and desired final ozone concentration, in certain embodiments, the rate of recirculation ranges from one to 10, 100 times or more. Similarly, the temperature of the recirculation is generally in the range of 4° C. to 70° C.

The voltage applied to the cell can be alternating (on/off) or continuous. In certain embodiments, in order to maintain the ozone concentration to a given amount that is below the maximum amount possible with the current apparatus, the voltage to the cell can be held continuous but at a lower power in order to continuously maintain the desired ozone concentration. In certain embodiments, the voltage will be maintained in the range of 4V to 24V.

In some embodiments, the apparatus also includes an ozone detector can be used to measure the ozone concentration in real time and via a feedback control the power to the cell. In particular embodiments, the apparatus and method of the invention are capable of producing ozone concentrated water at high concentrations. In certain embodiments, the concentration of ozone obtained for dosing is in the range of 0 to 30 ppm.

The entire contents of all patents, published patent applications and other references cited herein are hereby expressly incorporated herein in their entireties by reference.

Those skilled in the art will recognize, or be able to ascertain using no more than routine experimentation, numerous equivalents to the specific procedures described herein. Such equivalents are considered to be within the scope of this invention and are covered by the following claims.

The invention claimed is:

1. An apparatus for increasing the concentration of dissolved ozone in water comprising: an electrolytic cell including at least one reaction chamber, an anode and a cathode spaced apart from said anode by a polymer electrolyte membrane, and one or more water storage tanks configured for continuous recirculation of water without addition or loss of water through one or more of the reaction chambers until a predetermined concentration of dissolved ozone in the water is obtained.

2. The apparatus according to claim 1, wherein the anode and cathode are housed in separate chambers, wherein said chambers are in communication through a polymer electrolyte membrane.

3. The apparatus according to claim 2, wherein the polymer electrolyte membranes is a poly(perfluorosulfonic acid) membrane, a styrene based membrane, or a poly(arylene ether) membrane.

4. The apparatus according to claim 1, wherein the anode and cathode are housed in the same chamber and are in communication through the polymer electrolyte membrane.

5. The apparatus according to claim 1, wherein the anode and cathode are housed in separate chambers and are supplied water from separate water storage tanks such that the water from each tank is recirculated separately.

6. The apparatus according to claim 1, wherein the anode and cathode are housed in separate chambers and are supplied water from the same water storage tank such that the water from the tank is recirculated across both the anode and cathode.

7. The apparatus according to claim 1, wherein the anode is supplied water from a water storage tank such that the water from the tank is recirculated and the cathode is supplied water from a separate flow through source.

8. The apparatus according to claim 1, wherein the anode and cathode are housed in the same chamber and are supplied water from one storage tank such that the water from the tank is recirculated across both the anode and cathode.

9. The apparatus according to claim 1, wherein the cathode and anode are made of same material.

10. The apparatus according to claim 1, wherein the cathode and anode are made of different materials.

11. The apparatus according to claim 10, wherein the conductive diamond anode is a nanocrystaline diamond anode coated onto a substrate.

12. The apparatus according to claim 11, wherein the polymer electrolyte membranes is a poly(perfluorosulfonic acid) membrane.

13. The apparatus according to claim 1, wherein the anode is a conductive diamond anode.

14. The apparatus according to claim 1, wherein a constant current is applied to the cell and the dissolved ozone has a concentration of about 30 ppm or less.

15. A method for increasing the concentration of dissolved ozone in water comprising steps of: providing an apparatus according to claim 1, and electrolyzing water.

16. The method according to claim 15, wherein the electrolyzed water containing dissolved ozone is recirculated continuously.

17. The method according to claim 15, wherein the electrolyzed water containing ozone is only recirculated through the anodic chamber of the apparatus.

18. The method according to claim 15, wherein a constant current is applied to the cell and the dissolved ozone has a concentration of about 30 ppm or less.

19. A method for increasing the concentration of dissolved ozone in water comprising steps of: providing an apparatus according to claim 1, electrolyzing water to produce electrolyzed water containing dissolved ozone, and recirculating the electrolyzed water containing dissolved ozone through the apparatus one or more times until a desired concentration of ozone is obtained.

20. The method according to claim 19, wherein a constant current is applied to the cell and the dissolved ozone has a concentration of about 30 ppm or less.

* * * * *